: 3,060,173
Patented Oct. 23, 1962

3,060,173
PRODUCTION OF OMEGA-AMINO DODECANE ACID LACTAM
Otto von Schickh and Horst Metzger, both of Ludwigshafen (Rhine), Germany, assignors to Badische Anilin- & Soda-Fabrik Aktiengesellschaft, Ludwigshafen (Rhine), Rheinland-Pfalz, Germany
No Drawing. Filed June 14, 1961, Ser. No. 126,758
Claims priority, application Germany May 30, 1958
5 Claims. (Cl. 260—239.3)

This invention relates to a process for the production of omega-amino dodecane acid lactam also known as omega-amino lauric acid lactam or, briefly, as omega-lauric lactam. More specifically, the invention relates to a process for the production of omega-lauric lactam which is characterized by an especially simple working up of the reaction mixture.

It is known that omega-lauric lactam is obtained by rearranging cyclododecanone oxime in sulfuric acid and neutralizing the rearrangement mixture with basic substances. This method has the particular disadvantage that the omega-lauric lactam, analogously to lower lactams, for example caprolactam, or higher homologues, must be recovered from the rearrangement mixture by neutralization. Large amounts of basic substances are needed for the neutralization because the rearrangement is carried out in an excess of sulfuric acid. Another disadvantage is that correspondingly large amounts of salts are formed, usually ammonium sulfate. Since it is not desirable to have to work up large amounts of liquid, provision is made that the ammonium sulfate occurs in concentrated solution. The pipes in which such solutions are conveyed must be heated to avoid deposition of crystals. Ammonium sulfate, to be true, can be used as a fertilizer, but the plant required for its recovery from the rearrangement mixture is so expensive that the use of sulfuric acid would be departed from if it were possible to recover the lactam from the rearrangement mixture without neutralization.

It is an object of this invention to provide a process in which the omega-amino cyclododecane acid lactam is recovered from the rearrangement mixture without neutralization. It is another object of the invention to provide a process for the production of omega-amino cyclododecane acid lactam which remains unaffected by the deposition of crystals in the apparatus. Other objects will become apparent from the description hereinafter.

In accordance with the present invention these objects and advantages are achieved by treating cyclododecanone oxime hydrochloride or cyclododecanone oxime sulfate with sulfuric acid at a temperature of between 80° and 150° C. for rearrangement to omega-amino dodecane acid lactam and introducing the resulting rearrangement mixture containing the lactam and sulfuric acid into water without neutralization of the sulfuric acid contained in the diluted rearrangement mixture with a basic substance. The omega-amino dodecane acid lactam formed is thereby approximately quantitatively precipitated and separated from the liquid constituents of the diluted rearrangement mixture.

Cyclododecanone oxime hydrochloride has not heretofore been described. It can be prepared, for example, by introducing nitrosyl chloride or nitrogen monoxide and chlorine, as nitrosating agent, into cyclododecane dissolved in an inert solvent. Cyclododecane is obtained in conventional manner, for example by trimerization of butadiene-(1,3) and subsequent hydrogenation of the cyclododecatriene-(1,5,9) thus formed. The solvent may have been previously saturated with hydrogen chloride. It is also possible to lead in hydrogen chloride during introduction of the nitrosating agent. The reaction mixture is irradiated with light, for example light of a wave length ranging between about 350 and 450 millimicrons. The reaction temperature is from —30° to +40° C., preferably from 10° to 25° C. Instead of nitrosyl chloride or nitrogen monoxide and chlorine there may also be used other compounds from which nitrosyl chloride is formed by reaction, for example an alkyl nitrite and hydrogen chloride. When using nitrogen monoxide and chlorine, the volumetric ratio may be varied from 5:1 to 1:2.

Liquids suitable as solvents for cyclododecane are those being inert to the reactants, having good solvent power for the nitrosating agent, the hydrogen chloride and the cyclododecane and in which cyclododecanone oxime hydrochloride is insoluble or only sparingly soluble. Examples of such solvents are halogenated hydrocarbons, such as carbon tetrachloride, and ethers, such as dibutyl ether or dioxane. It is possible to work with saturated solutions or to introduce into the solvent only so much cyclododecane as is reacted. It is advantageous to continuously feed the nitrosating agent into the solution of cyclododecane in such an amount that the concentration of nitrosating agent in the reaction mixture is sufficient to ensure the absorption of the rays of active light. The liquid or crystalline cyclododecanone oxime hydrochloride which settles at the bottom of the reactor or floats on the reaction mixture, depending on the density of the solvent used, can be separated either discontinuously or continuously by pumping it in cyclic fashion through a filter or a separator. By appropriately choosing the concentration of the cyclododecane in the solution the oxime hydrochloride can be made to separate in solid or liquid form. The liquid cyclododecanone oxime hydrochloride which contains more than 1 mol and at the most 2 mols of hydrogen chloride per mol of oxime is mainly formed, given a certain amount of hydrogen chloride, when small concentrations of cyclododecane are used. The conditions are preferably adapted to the formation of the crystalline form which contains 1 mol of HCl per each mol of oxime.

When carrying out the process continuously, a dark colored coating may deposit on the glass parts of the apparatus and impair the permeability to light with a consequent extension of the reaction period. In order to prevent such deposits, the solution of cyclododecane may have added thereto, prior to the reaction, 0.5 to 5% by weight of a mixture of the above-mentioned byproducts formed by the nitrosation of cyclododecane, or a solution of cyclododecane may be used of which the solvent already contains at least 0.5% by weight of these byproducts from previous reactions.

Mercury vapor lamps, other metal vapor lamps, electric arcs, incandescent bulbs and also sunlight may be used as a source of light.

It will be understood that cyclododecanone oxime hydrochloride can also be obtained by feeding hydrogen chloride into a solution of cyclododecanone oxime in an inert solvent. Cyclododecanone oxime sulfate can be produced in basically the same manner, i.e., by reacting the free oxime with sulfuric acid in an inert solvent. The term "cyclododecanone oxime sulfate" is intended to include both the acid and the neutral sulfate of the oxime. It is, however, more convenient to start from the free oxime and convert it into cyclododecanone oxime sulfate by dissolution in the sulfuric acid in which the following rearrangement is to be carried out. Cyclododecanone oxime is obtained by a prior art method by heating cyclododecanone with hydroxylammonium chloride and sodium hydrogencarbonate in methanol, diluting the mixture with water, shaking out with ether and evaporating the solvent.

In a preferred embodiment of the invention the cyclododecanone oxime sulfate is formed in situ by the interaction of a hydroxylammonium salt and cyclododecanone in the sulfuric acid in which the subsequent rearrangement is to be carried out. The formation of the cyclododecanone oxime sulfate and its rearrangement are thus combined into a one-stage operation.

The rearrangement in accordance with the invention is carried out in sulfuric acid whatever the starting compound used. Within the scope of our invention the term "sulfuric acid" is meant to include an aqueous sulfuric acid which contains more than 70% by weight of sulfuric acid and accordingly less than 30% by weight of water. For example 90%, or concentrated (i.e., 96 to 98%) sulfuric acid may be used. It is also possible to use sulfuric acid of lower concentration, for example one with a concentration of 75% or 80%, but in this case it will be difficult to ascertain the reaction conditions under which the reaction, on the one hand, is carried to completion and pure omega-lauric lactam, on the other hand, is obtained. Especially pure lactam is obtained by using sulfuric acid of from 94% to 98% strength.

The term "sulfuric acid" is further meant to include anhydrous sulfuric acid, the so-called monohydrate, and also fuming sulfuric acid, also known as oleum, with a sulfur trioxide content of up to 50% by weight. The preferred fuming sulfuric acids are those which contain up to 25%, especially up to 15%, of sulfur trioxide.

A preferred embodiment of the process in accordance with our invention consists in feeding the cyclododecanone oxime hydrochloride into preheated sulfuric acid by small portions. In general, the rearrangement is carried out at temperatures of 80° to 150° C., advantageously at 115° to 130° C. The ratio by weight of cyclododecanone oxime hydrochloride to sulfuric acid lies as a rule between 1:0.6 and 1:5, advantageously between 1:0.6 and 1:2. To be understood, it is also possible to use a higher amount of sulfuric acid but this is to no appreciable advantage.

The rearrangement and the release of hydrogen chloride take place simultaneously, so that a considerable part of the rearrangement heat is withdrawn. When the introduction of the cyclododecanone oxime hydrochloride is finished the reaction mixture is further kept for some time, for example for 5 to 15 minutes, at the reaction temperature, the reaction being thus completed.

The rearrangement mixture is then treated with water without neutralization of the sulfuric acid by the addition of basic substances. The term "water" is meant to include both liquid water and ice. It is preferable to use the water at least partially in the form of ice because this aids in keeping the temperature low. The temperatures may rise to 100° C.; it is advantageous, however, to maintain the temperature below 50° C.

For example water may be allowed to flow into the rearrangement mixture, but it is preferable to work conversely by introducing the rearrangement mixture into water or pouring it onto ice. The use of ice is to be recommended insofar as in this way the considerable heat of dilution of the sulfuric acid is consumed in the melting of the ice. The desired temperature can be maintained in this way without difficulty.

Ice and/or water is used in such an amount that the concentration of sulfuric acid in the diluted mixture amounts at the most to 60% by weight. The omega-lauric lactam is precipitated approximately quantitatively if the concentration of sulfuric acid in the diluted mixture amounts to 50%. In general the water and/or ice are used in such an amount that the sulfuric acid concentration in the diluted rearrangement mixture amounts to 10 to 50%. To be understood, higher concentrations may also be applied, but they will not produce any additional advantage.

The crude lactam which is available already in a very pure state after having been filtered off by suction may be further purified by sublimation, distillation or recrystallization.

When carrying out the process batchwise, the sulfuric acid or oleum may be present partly at the beginning of the rearrangement reaction and further added as needed in proportion to the addition of cyclododecanone oxime hydrochloride.

The addition of omega-amino dodecane acid lactam, for example 1 to 10% with reference to sulfuric acid, promotes the initiation of the rearrangement reaction and prevents an uncontrollable sudden rise in temperature as a result of the retardation of the reaction.

The process is carried out under the same conditions with cyclododecanone oxime sulfate being used instead of the hydrochloride. In this case cyclododecanone oxime sulfate is used by itself, or the free cyclododecanone oxime is introduced into the sulfuric acid, the sulfate thereby being formed.

As mentioned above, a preferred embodiment of the invention comprises the reaction of cyclododecanone with a hydroxylammonium salt in sulfuric acid, the cyclododecanone oxime sulfate thus formed in situ being rearranged to the lactam immediately after its formation. The ratio by weight of cyclododecanone and sulfuric acid lies as a rule between 1:0.6 and 1:5, advantageously between 1:0.6 and 1:2. Larger amounts of sulfuric acid will not be to any appreciable advantage.

Suitable hydroxylammonium salts are the salts of hydroxylamine with strong acids, preferably inorganic acids, such as sulfuric acid or hydrochloric acid. It is advantageous to use hydroxylammonium sulfate. The hydroxylammonium salt is preferably used in at least the stoichiometrical amount with reference to the cyclododecanone, but preferably in an excess, for example, of from 1 to 25%. The conditions of operation, including concentration of the sulfuric acid, temperature, working up of the reaction mixture, are otherwise identical with those set forth above for the reaction of cyclododecanone oxime hydrochloride.

When carrying out the process in a batchwise fashion, the hydroxylammonium salt is dissolved, while heating, in sulfuric acid and to this solution the crystalline or fused cyclododecanone is added while stirring. By cooling the mixture or by adding the cyclododecanone at a sufficiently slow rate, the reaction temperature may be kept at the desired level. After all the cyclododecanone has been added, the temperature of the mixture is advantageously maintained for some time, for example 5 to 15 minutes, at the same level to complete the reaction. In this way the reaction ordinarily takes between 15 and 45 minutes to complete.

In carrying out the process continuously, the cyclododecanone and the hydroxylammonium salt are dissolved in sulfuric acid and continuously introduced into a reactor preheated to the reaction temperature. The withdrawal of the reaction mixture may be effected through a heated overflow pipe in which the reaction is carried to completion. Supply and withdrawal are correlated so that the average residence period is between about 5 and about 30 minutes.

As mentioned above, in the preferred embodiments of this invention, cyclododecanone oxime hydrochloride or the sulfate formed intermediately from cyclododecanone and a hydroxylammonium salt are rearranged. The advantage of the process in which the hydrochlorides are used as starting compounds as compared to the rearrangement starting from the free oxime, lies in the lower sensitivity of the hydrochlorides to temperature. In the rearrangement starting from the free oxime, any marked fluctuations in the temperature have an unfavorable effect on the yield and quality of the lactam. By contrast, fluctuations in the temperature have no effect on the end product in the rearrangement of cyclododecanone oxime hydrochlorides. Furthermore, a considerable amount of heat is withdrawn during rearrangement by the hydrogen halide which is set free quantitatively, so that temperature control is simplified. In the process according to this invention, therefore, better yields of omega-amino dodecane acid lactam are obtained. The hydrogen halide set free during the process may be used for different purposes.

The advantage of the processing technique which consists in reacting cyclododecanone with a hydroxylammonium salt and rearranging the cyclododecanone oxime obtained lies in the fact that excellent yields of lactam can be obtained by a one-stage process.

It was surprising that the omega-amino dodecane acid lactam can be separated by treatment of the reaction mixture with water, i.e., from a strongly acid solution. Both with lactams having a lower number of ring members (epsilon-caprolactam) and with those having a higher number of ring members (omega-aminopentadecanoic acid lactam), a neutralization of the aqueous sulfuric acid mixture is necessary (U.S. patent specification No. 2,579,851). According to the new process, simpler plant equipment is used and chemicals are saved.

Omega-amino dodecane acid lactam is a valuable intermediate product for the production of polyamides. Thus, the homopolymer of this lactam can be prepared according to well-known polymerization techniques as are employed, e.g., in the production of polycaprolactam. The omega-aminododecane acid lactam can also be employed as a comonomer in modifying known polyamides by copolymerization with caprolactam or other monomeric lactams.

The following examples will further ilustrate this invention but the invention is not restricted to these examples. The parts specified in the examples are parts by weight.

EXAMPLE 1

Preparation of Cyclododecanone Oxime Hydrochloride

Into a cylindrical stirring vessel 21 cms. long and 9.5 cms. in internal diameter there is placed a cooling vessel of glass or quartz provided with an inlet and outlet and open at the top and into this there is introduced a mercury immersion lamp of 80 watts power. A solution of 400 grams of cyclododecane in 450 grams of carbon tetrachloride is charged into the reaction chamber, saturated at 15° to 20° C. with hydrogen chloride and then 6.5 grams of nitrosyl chloride are dissolved therein. This mixture is irradiated while stirring and cooling to 15° to 20° C. and at the same time such an amount of hydrogen chloride is led in that the reaction mixture is continuously saturated with hydrogen chloride. Even soon after the beginning of the irradiation, cyclododecanone oxime hydrochloride separates at first as an oil which forms a crystalline solid after a short time. After irradiation for 2 hours, another 6.5 grams of nitrosyl chloride is dissolved and further irradiation is carried out with simultaneous supply of hydrogen chloride. This process is again repeated with another 6.5 grams of nitrosyl chloride after 2 hours. After a total reaction period of 6 hours, the precipitated cyclododecanone oxime hydrochloride, which is floating on the cyclododecane solution, is filtered off, washed with a little carbon tetrachloride and petroleum ether and the crystallized product dried for several hours in vacuo. The cyclododecane solution can be used for another experiment without previous purification, if necessary after adding fresh cyclododecane.

In order to determine the yield, the cyclododecane solution remaining after filtering off the crystals by suction is washed with 2-normal caustic soda solution to remove dissolved hydrogen chloride and distilled. After distilling off the carbon tetrachloride at normal pressure there are obtained 359.5 grams of cyclododecane of the boiling point (at 15 mm. Hg) 116° to 117° C., melting point 61° C. As the distillation residue there remain 9.5 grams of a fraction containing chlorine. The yield of cyclododecanone oxime hydrochloride of the melting point 128° to 129° C. is 50.5 grams, i.e., 89.5% of the theory, with reference to the hydrocarbon reacted.

Analysis of the cyclododecanone oxime hydrochloride: $C_{12}H_{23}NO \cdot HCl = 233.8$.—Calculated: C, 61.62; H, 10.34; N, 5.98; Cl, 15.16. Found: C, 61.4; H, 10.4; N, 6.2; Cl, 14.9.

Rearrangement of the Hydrochloride 78 grams of cyclododecanone oxime hydrochloride (corresponding to 65.8 grams of free oxime) are introduced during the course of about 15 minutes while stirring into a solution, preheated to 120° to 125° C., of 7 grams of omega-aminododecane acid lactam in 30 grams of concentrated sulfuric acid. At the same time there are added 80 grams of concentrated sulfuric acid. The inflow of the recatants is regulated so that the reaction mixture is kept at a temperature of 120° to 125° C., for which purpose cooling or heating is applied if necessary.

After all of the reactants have been introduced, the whole is stirred for about 5 minutes at 120° to 125° C., allowed to cool rapidly and the reaction mixture poured onto about 200 grams of ice while stirring. The omega-aminododecane acid lactam which thereby immediately separates in crystalline form is filtered off by suction, washed with water and dried. 70.2 grams of omega-aminododecane acid lactam of the melting point 149° to 150° C. are obtained, i.e., 96% of the theory. By sublimation of the crude lactam at $10^{-2}$ mm. Hg and 150° C. bath temperature, 68.8 grams of completely pure omega-aminododecane acid lactam of the melting point 154° to 154.5° C. are obtained. The crude lactam may also be recrystallized from ethyl acetate, dilute hydrochloric acid or dilute sulfuric acid.

EXAMPLE 2

Rearrangement of Cyclododecanone Oxime Hydrochloride 50 grams of crystalline cyclododecanone oxime hydrochloride, corresponding to 42.2 grams of free oxime, are introduced during the course of about 10 minutes while stirring into a solution, preheated to 120° to 125° C., of 5 grams of omega-amino-dodecane acid lactam in 30 grams of 88% sulfuric acid. At the same time, 40 grams of 88% sulfuric acid are added in such fashion that the reaction mixture is kept at a temperature of 120° to 125° C. When all the reactants have been added, the whole is stirred for about another 5 minutes at 120° to 125° C., allowed to cool rapidly and the reaction mixture poured onto 200 grams of ice while stirring. The omega-amino-dodecane acid lactam formed is filtered off by suction, washed with water and dried. 44.8 grams of omega-amino-dodecane acid lactam of the melting point 147° to 149° C. are obtained, i.e., 95% of the theory.

By sublimation of the crude lactam at 0.01 mm. Hg and 150° C. bath temperature, 43.3 grams of lactam of the melting point 152° to 153° C. are obtained.

EXAMPLE 3

Preparation of Cyclododecanone Oxime Hydrochloride

A mixture of 1.25 liters of chlorine and 1.5 liters of nitrogen monoxide (converted to 760 mm. Hg and 0° C.) is introduced into a solution of 250 grams of cyclododecane in 750 grams of carbon tetrachloride in a reaction vessel as described in Example 1 at 15° to 20° C. while stirring vigorously. 15 minutes after the commencement of the introduction, the mercury immersion lamp is switched on. After 2½ hours, the introduction is discontinued and after another 15 minutes the lamp is switched off. The colorless cyclododecanone oxime hydrochloride formed is filtered off by suction, washed with a little petroleum ether and dried. 26.5 grams of cyclododecanone oxime hydrochloride of the melting point 129° to 130° C., i.e., 68% of the theory with reference to the nitrogen monoxide introduced, are obtained.

Rearrangement of the Hydrochloride 11.7 grams of cyclododecanone oxime hydrochloride, corresponding to 9.8 grams of free oxime, are covered with 20 grams of concentrated sulfuric acid and carefully heated to about 100° C. until the rearrangement reaction sets in. About 1.8 grams of hydrogen chloride gas thereby escape. The temperature is kept at 115° to 125° C. by appropriate cooling. When the rearrangement is complete, it is allowed to cool and the reaction mixture is poured onto 30 grams of ice while stirring. The omega-amino-dodecane acid lactam thus separates in crystalline form. The lactam is filtered off by suction and dried. 7.9 grams of the melting point 147° to 148° C. are obtained, i.e., 89% of the theory. After a single sublimation at $10^{-2}$ mm. Hg and 150° C. there are obtained 7.6 grams of a completely pure product of the melting point 153° to 154° C.

EXAMPLE 4

Rearrangement of Cyclododecanone Oxime Hydrochloride

For the rearrangement, the procedure of Example 2 is used but 70 grams of 100% sulfuric acid are used in all. The product is worked up in the same way and 45.1 grams of crude omega-amino-dodecane acid lactam of the melting point 148° to 150° C. are obtained (95.5% of the theory) or, after sublimation, 43 grams of the melting point 153° C.

If, however, a total of 70 grams of a sulfuric acid which contains 5% of free sulfur trioxide is used, there are obtained after working up according to Example 2, 44.4 grams of crude omega-amino-dodecane acid lactam of the melting point 148° to 150° C. (94% of the theory) or, after sublimation, 42.1 grams of the melting point 153° C.

EXAMPLE 5

Preparation of Cyclododecanone Oxime Hydrochloride

A solution of 100 grams of cyclododecane in 900 grams of carbon tetrachloride in a reaction vessel as described in Example 1 is saturated at 15° to 20° C. with hydrogen chloride and then 6.5 grams of nitrosyl chloride are dissolved therein. This mixture is irradiated while stirring at 15° to 20° C. and at the same time hydrogen chloride is led in in such an amount that the reaction mixture is continuously saturated with hydrogen chloride. After each 2 hours of irradiation, a further 6.5 grams of nitrosyl chloride are dissolved and the irradiation continued with simultaneous supply of hydrogen chloride. After a total reaction period of 6 hours, 57.5 grams of the yellow-red colored oil floating on the solution are separated.

By further working up as described in Example 1, there are obtained by distillation 60.0 grams of unreacted cyclododecane.

To determine the content of free oxime, 10 grams of the liquid cyclododecanone oxime hydrochloride are pumped off at room temperature until a solid crystal mass has been formed. After digesting these crystals with water, filtering off and drying there are obtained 7.7 grams of cyclododecanone oxime of the melting point 131° C. From this there may be calculated a yield of cyclododecanone oxime (in the form of the liquid hydrochloride) of 47.3 grams, i.e., 85% of the theory with reference to cyclododecane reacted.

Rearrangement of the Hydrochloride 43.2 grams of the liquid cyclododecanone oxime hydrochloride (corresponding to 32.9 grams of free oxime) are allowed to flow while stirring into a solution, preheated to 115° to 125° C., of 10 grams of omega-amino-dodecane acid lactam in 30 grams of sulfuric acid (100%). At the same time 50 grams of sulfuric acid (100%) are added. The supply of the reactants is regulated so that the reaction temperature remains between 115° and 125° C. About 10 grams of hydrogen chloride escape. It is stirred at 120° C. for about another 5 minutes and the whole worked up as in Example 1. 41.2 grams of crude lactam of the melting point 148° to 149° C. are obtained, i.e., 95% of the theory, and, after sublimation, 40.0 grams of pure lactam of the melting point 153° to 154° C., 90% sulfuric acid may be used for the rearrangement instead of 100° sulfuric acid with the same result.

EXAMPLE 6

60 parts of cyclododecanone are added to a solution, preheated to 120° C., of 35 parts of hydroxylammonium sulfate (94.8%) in 80 parts of 96% sulfuric acid during the course of about 20 minutes while stirring well, provision being made by occasional heating or cooling that the reaction temperature is maintained at 123° to 128° C. Supplementary reaction is allowed to take place for 5 minutes at about 125° C., the whole is cooled to about 50° C. and the reaction mixture poured onto 200 parts of ice while stirring. The omega-lauric lactam which thus separates in crystalline form if filtered off by suction, washed with water and dried. 61.7 parts, corresponding to 95% of the theory, of omega-lauric lactam of the melting point 149° to 150° C. are obtained. By sublimation of the crude lactam at $10^{-2}$ mm. Hg and 150° C. bath temperature, 60.4 parts of pure omega-lauric lactam of the melting point 154° C. are obtained. The crude lactam may also be recrystallized from ethyl acetate, dilute hydrochloric acid or dilute sulfuric acid.

EXAMPLE 7

The procedure of Example 6 is followed but 80 parts of a 90% sulfuric acid are used. 61.1 parts, i.e., 94% of the theory, of crude omega-lauric lactam of the melting point 148° to 149° C. are obtained and, after sublimation of the crude product, 59.5 parts of pure lactam of the melting point 153° C.

EXAMPLE 8

182 parts of cyclododecanone are added within 25 minutes while stirring well to a solution, preheated to 120° C., of 90 parts of hydroxylammonium sulfate (94.8%) in 180 parts of 100% sulfuric acid (monohydrate) and the reaction temperature is maintained at 125° to 130° C. by occasional cooling or heating. The whole is then stirred for 5 minutes at 125° C. and worked up as described in Example 6. 185.5 parts of crude omega-lauric lactam of the melting point 147° to 148° C. are obtained. The yield is 94% of the theory. 177.5 parts of pure lactam of the melting point 153° C. are obtained by sublimation.

EXAMPLE 9

The procedure of Example 6 is followed but using 80 parts of oleum with 8% by weight of sulfur trioxide. 61.1 parts, i.e., 94% of the theory, of crude omega-lauric lactam of the melting point 148° to 149° C. are obtained and, after sublimation, 58.7 parts of pure lactam of the melting point 153° C.

By carrying out the reaction at a temperature of between 115° and 120° C., but otherwise working under the said conditions, 57.2 parts of pure lactam are obtained.

EXAMPLE 10

25 parts of hydroxylammonium chloride (96.2%) are introduced into 80 parts of 98% sulfuric acid. After the hydrogen chloride set free has substantially escaped, the solution is heated to 125° C. and 60 parts of cyclododecanone are added within about 15 minutes while stirring well, provision being made by occasional cooling or heating for the maintainance of the reaction temperature at 125° to 130° C. The whole is allowed to react further for 5 minutes and then worked up as described in Example 6. 60.4 parts, i.e., 93% of the theory, of crude omega-lauric lactam of the melting point 149° to 150° C. are obtained, and, after sublimation, 58.6 parts of pure lactam of the melting point 154° C.

EXAMPLE 11

A reaction vessel which is provided with a stirring means and with a heatable overflow pipe of such length that residence periods of 5 to 20 minutes are ensured, is filled with concentrated sulfuric acid. The contents are heated to 120° to 130° C. and 300 parts of cyclododecanone, 300 parts of concentrated sulfuric acid and 150 parts of hydoxylammonium sulfate added continuously per hour, the reaction temperature being maintained at 120° to 130° C. The reaction mixture flowing away from the overflow pipe is introduced into cold water while stirring and the crude omega-lauric lactam which separates in crystalline form is continuously centrifuged off. Crude lactam of the melting point 149° to 150° C. is thus obtained in a yield of 95% of the theory.

EXAMPLE 12

60 parts of cyclododecanone are added to a solution, preheated to 120° C., of 35 parts of hydroxylammonium sulfate (94.8%) in 300 parts of 96% sulfuric acid during the course of about 20 minutes while stirring well, provision being made by occasional heating or cooling that the reaction temperature is maintained at 123° to 128° C. When the reaction is finished the reaction mixture is poured onto 500 parts of ice while stirring. There are obtained 61.3 parts, i.e., 94% of the theory, of crude omega-lauric lactam with the melting point 149° to 150° C. and, by sublimation of the crude product, 59.8 parts of pure lactam of the melting point 154° C.

EXAMPLE 13

60 parts of cylododecanone are added to a solution, preheated to 120° C., of 35 parts of hydroxylammonium sulfate (94.8%) in 80 parts of 96% sulfuric acid during the course of about 20 minutes while stirring well, provision being made by occasional heating or cooling that the reaction temperature is maintained at 135° to 140° C. When the reaction is finished the reaction mixture is poured onto 80 parts of ice while stirring. There are obtained 58.2 parts, i.e., 89% of the theory, of crude omega-lauric lactam of the melting point 148° to 149° C. and, by sublimation of the crude product, 57.6 parts of pure lactam of the melting point 153° C.

EXAMPLE 14

60 parts of cyclododecanone are added to a solution, preheated to 120° C., of 35 parts of hydroxylammonium sulfate (94.8%) in 90 parts of 85% sulfuric acid during the course of about 20 minutes while stirring well, provision being made by occasional heating or cooling that the reaction temperature is maintained at 123° to 128° C. There are obtained 58.5 parts, i.e., 90% of the theory, of crude omegalauric lactam of the melting point 143° to 146° C. After recrystallization from acetic ester the product melts at 153° C.

EXAMPLE 15

60 parts of cyclododecanone are added to a solution, preheated to 120° C., of 35 parts of hydroxylammonium sulfate (94.8%) in 100 parts of oleum with 20 parts of sulfur trioxide during the course of about 20 minutes while stirring well, provision being made by occasional heating or cooling that the reaction temperature is maintained at 123° C. to 128° C. There are obtained 59.8 parts, i.e., 92% of the theory, of crude omega-lauric lactam of the melting point 147° to 148° C. and, by sublimation of the crude product, 56.7 parts of pure lactam of the melting point 153° C.

EXAMPLE 16

59.2 parts of cyclododecanone oxime are introduced within 20 minutes, while stirring, into a solution of 7 parts of omega-amino dodecane acid lactam in 30 parts of 96% sulfuric acid, the solution being preheated to 110° to 120° C. At the same time 100 parts of 96% sulfuric acid are added. The temperature is kept by cooling at between 110° and 120° C. The reaction mixture is stirred for 4 more minutes at 115° C. and subsequently poured onto 200 parts of ice while stirring, omega-amino dodecane acid lactam being precipitated in the form of yellowish crystals. The lactam is filtered off by suction, washed with water and dried with access of air. 57.8 parts of crude lactam, equal to 86% of the theory, are obtained. The melting point is 150° to 151° C. By sublimation in vacuo or by recrystallization from ethyl acetate 55 parts of very pure lactam having a melting point of 153.5° to 154° C. are obtained.

This application is a continuation-in-part of our copending applications Ser. No. 815,795, filed May 26, 1959, and Ser. No. 10,019, filed February 23, 1960, both now abandoned.

What we claim is:

1. In a process for the production of omega-amino dodecane acid lactam wherein a member selected from the group consisting of cyclododecanone oxime hydrochloride and cyclododecanone oxime sulfate is treated with sulfuric acid at a temperature of between 80° and 150° C. for rearrangement to said lactam, the improvement which comprises introducing the resulting rearrangement mixture containing said lactam and said sulfuric acid into water without neutralization of the rearrangement mixture with a basic substance, thereby approximately quantitatively precipitating said lactam, and separating the precipitated lactam.

2. A process as claimed in claim 1 wherein cyclododecanone oxime hydrochloride is used as starting compound.

3. A process as claimed in claim 1 wherein cyclododecanone oxime sulfate is used as starting compound.

4. A process as claimed in claim 3 wherein the cyclododecanone oxime sulfate is obtained from cyclododecanone oxime and sulfuric acid.

5. A process as claimed in claim 3 wherein the cyclododecanone sulfate is obtained from cyclododecanone and a hydroxylammonium salt in sulfuric acid.

No references cited.

UNITED STATES PATENT OFFICE
CERTIFICATE OF CORRECTION

Patent No. 3,060,173                      October 23, 1962

Otto von Schickh et al.

It is hereby certified that error appears in the above numbered patent requiring correction and that the said Letters Patent should read as corrected below.

Column 8, line 9, for "100°" read -- 100% --.

Signed and sealed this 11th day of June 1963.

(SEAL)
Attest:

ERNEST W. SWIDER
Attesting Officer

DAVID L. LADD
Commissioner of Patents